Aug. 21, 1962 J. D. SHAW 3,049,857
COMMINUTOR
Filed March 10, 1960 2 Sheets-Sheet 1

INVENTOR
John D. Shaw
BY Shoemaker and Mattare
ATTORNEYS

Aug. 21, 1962 J. D. SHAW 3,049,857
COMMINUTOR
Filed March 10, 1960 2 Sheets-Sheet 2

INVENTOR
John D. Shaw
BY *Shoemaker and Mattare*
ATTORNEYS

United States Patent Office 3,049,857
Patented Aug. 21, 1962

3,049,857
COMMINUTOR
John D. Shaw, 4931 Cordell Ave., Bethesda, Md.
Filed Mar. 10, 1960, Ser. No. 14,152
9 Claims. (Cl. 56—501)

This invention relates generally to the class of comminuting and is directed particularly to a new and novel mechanism for reducing to fine condition leaves, twigs, grass and similar material.

The disposition of leaves and small twigs, particularly in the Fall of the year, presents quite a problem to home owners, particularly in the city, where gardens and lawn may be covered or shaded by trees or have trees in the vicinity so that leaves therefrom fall over the garden.

Many home owners burn the leaves which they gather in the Fall but in congested districts this is forbidden by law and further it constitutes a considerable waste of valuable organic material which can be used to make compost and in many instances home owners and gardeners do pile the leaves in suitable receptacles or confined areas and allow them to decay for the purpose of producing composting material but when the leaves are so piled without being reduced in any manner, this decaying process is rather slow. By reducing the leaves, twigs, grass etc. to small particles, the resultant material, when placed on a compost pile or used in forming a compost pile, will decay very rapidly and thus becomes a valuable fertilizer for use over flower beds, lawns and the like.

It is a particular object of the present invention to provide a new and novel apparatus by means of which leaves, twigs, grass and the like can be easily and rapidly ground or chopped to be reduced to a fine material whereby it can be either spread directly over a lawn, incorporated in a compost bin or used as a mulch in flower beds or vegetable gardens.

A further object of the invention is to provide a new and novel mechanism of the character stated which can be made upon a small scale so that it can be readily moved about from place to place and at the same time will function efficiently to grind or reduce the material to a fine condition for use.

More particularly the invention has for an object to provide a comminuting apparatus for the purpose stated or for grinding any other type of material as may be desired, wherein means is provided for producing an air blast whereby the material may be readily forced through and between the grinding elements and discharged from the grinding chamber over the ground or into a receiver.

It is a further object of the present invention to provide a novel material grinding mechanism which may be conveniently mounted upon a carriage for movement over the ground and wherein air blast producing means may serve the dual function of drawing into the grinding chamber from the surface of the ground the leaves, grass or other material and for expelling the ground material from the chamber.

The invention broadly contemplates the provision of a housing having an inlet and an outlet with a stationary foraminous wall structure dividing the housing between the inlet and the outlet and with a rotor mounted in close proximity to the foraminous wall and on the side thereof adjacent to the inlet and carrying cutting, grinding or chopping fingers which coact with stationary fingers carried by the foraminous wall to reduce the leaves and other material to small particles which pass through the foraminous wall and to the outlet.

Associated with the structure within the housing is a means for producing an air blast directed toward the foraminous wall to force the ground material out of the housing, which means preferably embodies a series of blades carried by the rotor and in this way the rotor functions both as an element of the cutting mechanism and an element of the fan by which a current of air is drawn in through the inlet and forced through the foraminous wall to the outlet.

The present improved comminuting mechanism is adaptable to use in many positions or ways, as, for example, it may be placed upon the ground and material delivered thereto in any suitable manner, or it may be mounted upon perambulating structure and associated with a suction nozzle disposed close to the ground surface whereby the fan means in the housing may also function as a means for elevating the leaves, grass or other material from the ground and bringing it into the housing.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

Figure 1:
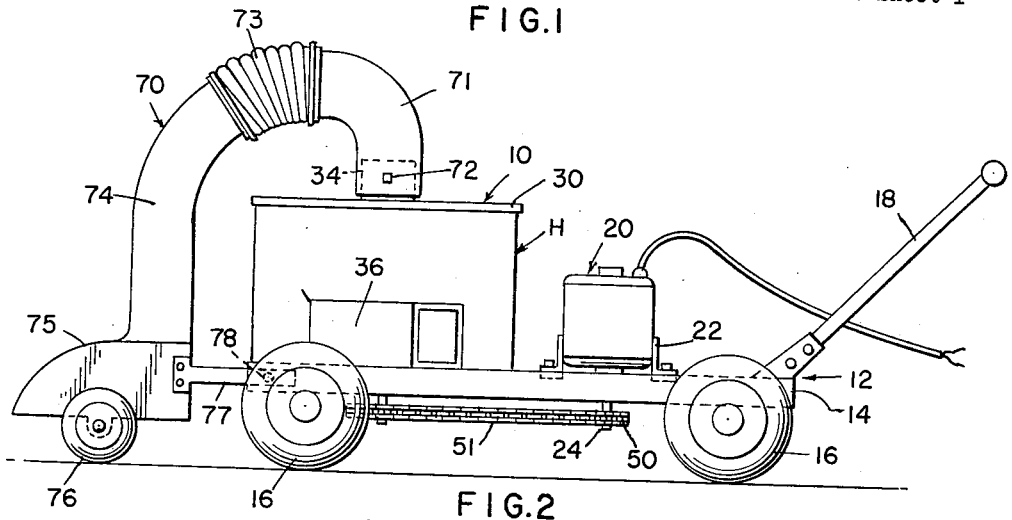
FIG. 1 is a view illustrating in side elevation a wheeled unit of a suitable character with which the comminuting mechanism of the present invention may be associated to function additionally as a suction means when the mechanism is moved over the ground.

Referring now more particularly to the drawings, the comminuting mechanism is designated generally or in its entirety by the reference character 10 and in FIG. 1 the mechanism is shown mounted upon a wheeled support or carriage whereby it may be moved conveniently from place to place. Also in this figure means is shown coupled with the mechanism whereby the fan or air blast producing means forming a part of the mechanism may be made to function to draw material thereinto. However, while the wheeled supporting structure will be described in some detail, it is to be understood that this is merely to show one way in which the mechanism can be handled or supported for use and it is not intended to limit the use of the mechanism in any manner.

Referring particularly to FIG. 1, there is illustrated in its simplest form a wheeled carriage which is generally designated 12 and which is shown as embodying a platform body 14 mounted upon wheels 16 and having connected therewith a suitable handle means or handle bar 18 whereby the wheeled structure or carriage can be shoved around from place to place.

While in FIG. 1, which merely shows the wheeled carriage in side elevation, only two supporting wheels are shown on the near side, it will, of course, be understood that the carriage may be equipped with four wheels, two forward and two at the rear, or it may have two wheels at one end and a single centrally disposed wheel at the other end to aid in the maneuverability thereof.

The comminuting mechanism generally designated 10 may be mounted upon the platform 14 adjacent to the forward end thereof, as illustrated, and also the platform or body 14 may have mounted thereon a suitable motor structure for operating the rotor of the comminutor, which motor structure is here generally designated 20 and is illustrated as an electric motor secured in position upon the platform between mounting brackets 22 and having the armature shaft 24 extended downwardly to the underside of the platform or body to be operatively connected with the mechanism 10 in the manner hereinafter described. However, while an electric motor has been illustrated, it is to be understood that if found desirable, the motor for operating the comminutor may be of the internal combustion type, such as is employed for operating power lawn mowers, etc.

The mechanism 10 embodies a circular housing which is generally designated H. The side wall of the housing is designated 26 while the numeral 28 designates the bottom. The top of the housing is here illustrated as being closed by a removable top wall, lid or cover generally designated 30. This top wall may be attached to the side wall in a suitable manner as by means of the encircling flange 31 engaging around the outer side of the wall 26, and secured thereto by screws 32 or in any other suitable manner.

The central portion of the top wall 30 has an inlet opening 33 defined by the upstanding pipe or neck 34 which may be straight or it may be in the form of a hopper, if desired, and it may take any shape but is preferably cylindrical.

The side wall 26 has an outlet opening 35 therein close to the bottom wall 28 and this outlet openings leads into the tangentially directed discharge nozzle 36, the top surface of the bottom wall 38 of which preferably is flush with the top of the housing bottom wall 28 so that a smooth delivery surface is provided between the two walls 28 and 38 which will not check or in any way interfere with the free delivery of ground material from the housing.

Partitioning the housing is a heavy wall plate 39 which fits snugly around its periphery against the inner side of the wall 26 and is, of course, of the same circular form as the interior of the housing and is maintained rigidly in position in any suitable manner as, for example, by means of bolts or screws 40 passing through the wall 26 and into the periphery of the plate wall 39. The partitioning wall or plate 39 is disposed in a plane perpendicular to the axial center of the housing and lying just above the top of the discharge nozzle 36.

The partitioning wall 39 has a central opening 41 therethrough and a multiplicity of smaller openings 42 which latter openings make of the wall 39 a screen or foraminous partition through which the ground or comminuted material passes.

The foraminous partitioning wall 39 is located a substantial distance below the top wall 30 and thus divides the interior of the housing into the large material receiving upper chamber 43 and the smaller ground or comminuted material chamber 44 which communicates with the outlet 35.

The bottom wall 28 has an opening 45 centrally thereof which aligns with the opening 41 in the partitioning plate 39 and extending upwardly through the bottom wall opening 45 is a shaft 46 supported upon a suitable bearing 47 resting upon the bottom wall or floor of the housing, by a suitable means such as a collar 48 encircling and fixed to the shaft, as shown. This is merely one way in which the shaft may be supported for rotation on the axial center of the housing, it being understood that any other suitable means may be employed for maintaining the shaft in this position so that it will rotate freely without whipping or lateral motion.

The lower end of the shaft has attached thereto a means for transmitting rotary motion from the motor 20, which means is here illustrated as a sprocket gear 49 and the motor shaft 24 carries a similar gear 50 and the gears are connected together by the driving connection in the form of a sprocket chain 51.

The shaft 41 passes upwardly through the central opening 41 in the partitioning wall plate 39 and carries upon its upper end a rotor unit which is generally designated 52.

The rotor unit embodies a series of arms 53 radiating from a central body portion 54 which body portion has an opening 55 therethrough, through which the upper end of the shaft 46 projects. The body portion of the rotor unit is secured to the upper end of the shaft 46 in a suitable manner, as, for example, by being mounted upon a collar 56 carried by the shaft and engaging the underside of the body portion 54, and having a nut 57 threaded upon the top end of the shaft and engaging the top of the body portion 54 of the rotor to secure it firmly on the shaft-carried collar 56. This collar 56 is here shown as being threaded onto the shaft 46 but obviously it may be fixed thereto by a set screw or held in place in any other suitable manner.

The foraminous wall plate 39 and the rotor unit 52 carry a multiplicity of cooperating cutter or chopper blades or fingers, those carried by the foraminous wall plate 39 being fixed to the latter to project upwardly while those carried by the rotor unit 52 are fixed to the arms 53 to project downwardly therefrom and these cooperating chopper blades or fingers are arranged so that the movable blades pass between the fixed blades with a small clearance whereby to cut, grind or chop any leaves, twigs or other material caught between the blades or forced by the rotating blades toward and through the openings between the fixed blades.

The fixed or stationary chopping fingers or blades which are carried by and project upwardly from the surface of the wall 39 are designated 58. These blades are arranged in radial rows, there being four such radial rows here illustrated although additional rows may be employed if desired. The blades 58 are in fixed spaced relation in their respective rows and the spacing is such, as above stated, as to permit the rotor-carried blades to pass between the fixed blades.

The rotor-carried chopper fingers or blades are designated 59 and these are fixed in rows to the arms 53 to project downwardly therefrom and are spaced apart so as to pass between pairs of fixed blades 58 with a slight or small clearance.

As an illustration, and without intending to limit the invention in any manner as to size or proportions of parts, the fixed chopping fingers and the rotatable chopping fingers may be spaced apart in their respective rows so as to allow a clearance of approximately $\frac{1}{16}$ of an inch between the chopping fingers or blades as they pass in the turning of the rotor.

The length of the chopping blades is such that there will be only a very slight clearance between the ends of the fixed blades and the undersides of the rotor arms 53 and the length of the rotor arm carried blades is also such that there will be only a very slight clearance between the lower ends thereof and the surface of the apertured or foraminous wall plate 39. Also the outermost fixed blade 58, in each of the rows thereof carried by the plate 39, will be close to the wall 26 so that no uncut material or large particles of uncut material can pass between the fixed blade and the wall.

The rotor structure further includes a means for forcing a volume of air through the foramonius or apertured wall plate 39 and such means also will function to pull material into the upper chamber 43 where this action may be desirable. To accomplish the forced draft or movement of air through the housing from the inlet 33 to the outlet 35 a plurality of fan blades are employed each of which is designated 60. Each of the fan blades 60 is mounted upon an arm 53 and is inclined from the top surface of its supporting arm or from the horizontal in the direction of rotation of the rotor, as is clearly shown in FIGS. 2 and 3. Each of the fan blades comprises the relatively long body portion 61 and a bottom obtusely angled flange 62 and as shown in FIG. 1, the flange of each blade is disposed upon the top of and longitudinally of its supporting arm 53. The blade flange 62 is disposed along the advancing edge of the arm and thus the row of rivet spots or rivet pins by which the flange is secured to the arm is to one side of the row of upper ends of chopping blades or fingers where they pass through the arm by which they are carried.

As previously stated, each of the fan blades is inclined from the horizontal in the direction of rotation of the rotor and each of the blade body portions 61 has an upwardly and inwardly curving outer edge 63 which merges with a more sharply inwardly curving top edge portion 64 and this top edge portion 64 at the inner side of the body 61 then curves back and down as indicated at 65, to join the relatively straight downwardly and radially outwardly extending inner edge 66. Thus it will be seen that due to the form and disposition of each of the fan blade bodies 61, as the rotor turns counter-clockwise, as viewed in FIG. 3, it will pull air in through the inlet 33 and force it downwardly through the apertures 42 of the foraminous wall plate 39 and any material entering the inlet 33 will also be forced down onto the plate so that as the chopping blades move around such material will be gathered up and forced through between the stationary chopping blades 58 and cut or chopped into small or fine particles as the material is forced between the fixed blades. Such material will be reduced to a size where it can readily pass through the openings 42 and the air current created by the blades will then discharge the material from the discharge nozzle 36.

The chopping blades or fingers 58 and 59 are formed of suitable steel bar stock of square or rectangular cross section, a square cross section being preferable, whereby, when the blades are set so that faces of the knives or fingers in the rows will be in a common plane radially of the rotor and the foraminous wall plate 39, two sharp corners 59a of each of the blades 59 carried by the rotor will act as cutting edges in cooperation with adjacent sharp corners 58a of stationary cutting blades or fingers between which they pass.

Figure 2:
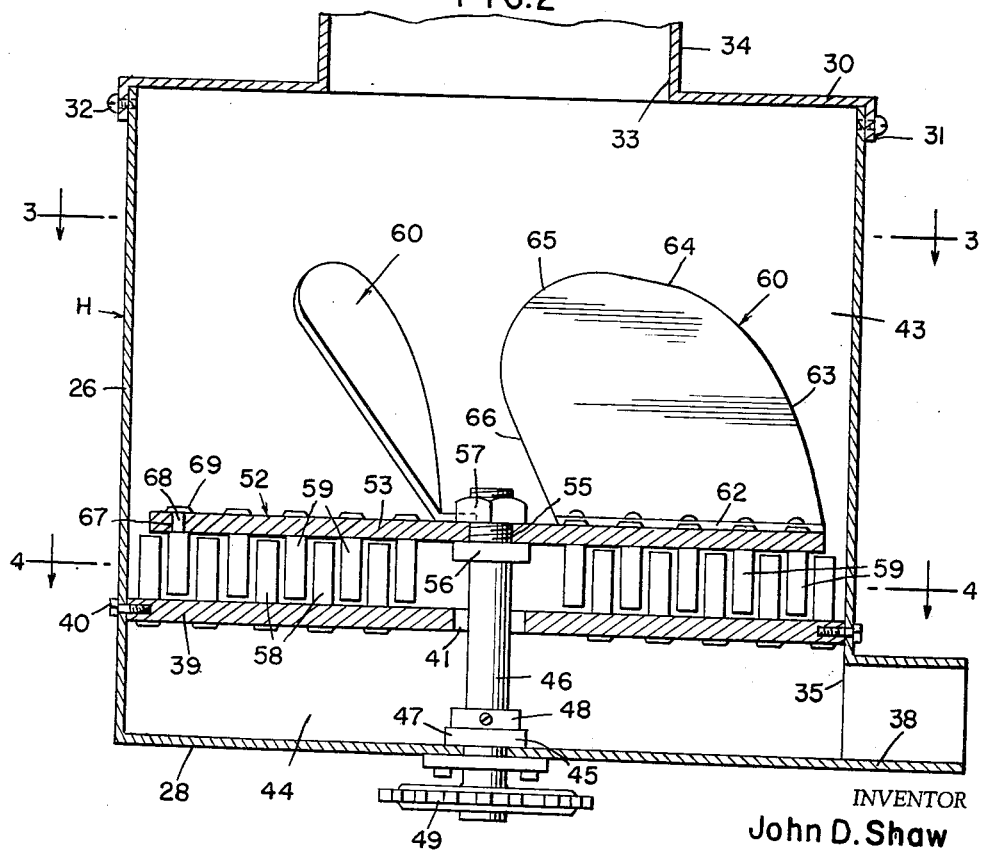
FIG. 2 is an enlarged view of the interior of the comminutor showing parts thereof in section and parts in elevation.
Figure 3:
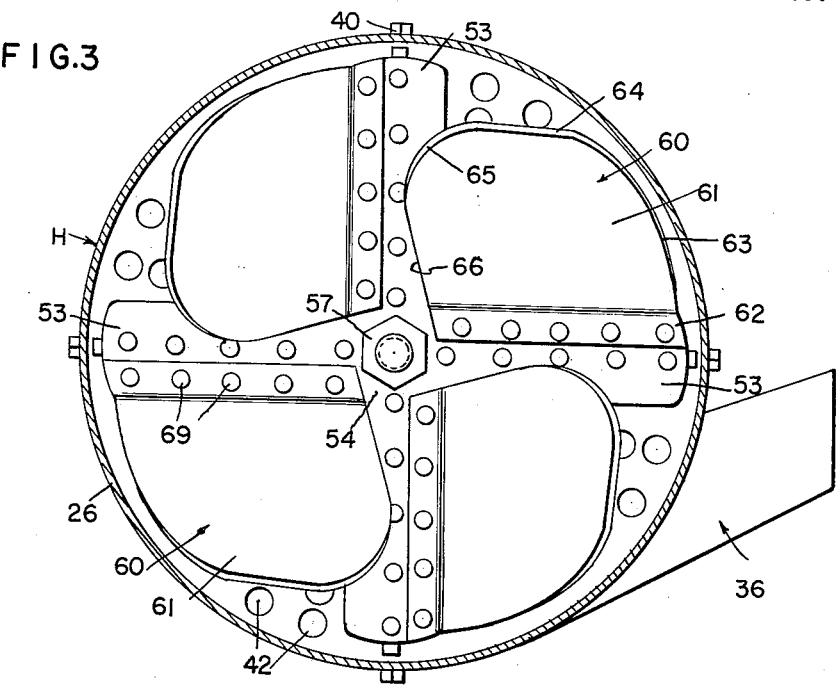
FIG. 3 is a transverse section taken substantially on the plane of line 3—3 of FIG. 2.
Figure 4:
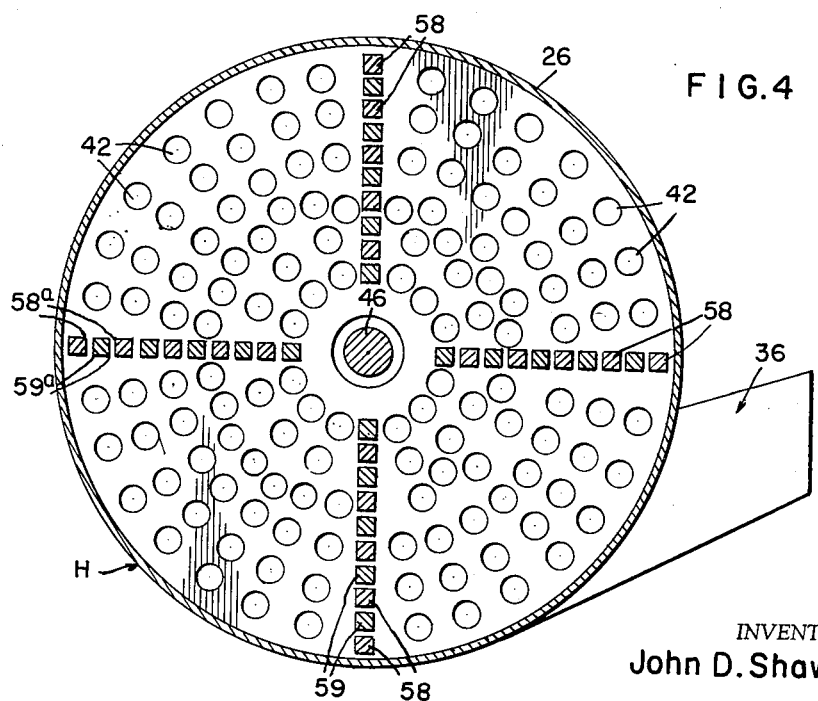
FIG. 4 is a transverse section taken substantially in the plane of line 4—4 of FIG. 2.

The blades or fingers carried by the foraminous plate 39 and the rotor arms 53 may be fixed to their respective supporting bodies in any suitable manner. One way of securing the blades might be by providing rows of apertures in the wall plate 39 and in the arms 53 to receive reduced end portions of the blades, after which the reduced end portions would be peened over to hold the blades in position. This form of construction is illustrated in FIG. 2 where one such opening is shown in an arm 53 at 67 and a cutting blade 59 is shown with a reduced end portion 68 in the opening with its top end mashed or peened over as at 69. It will be understood that this illustration is intended to convey the information that each of the other cutting blades or fingers would be secured in a like manner to its respective rotor arms 53 and to the plate body 39. However, other means may be employed for securing the cutter blades or fingers in place, if desired.

It will be readily apparent from the foregoing that in the operation of the present invention the material to be chopped or comminuted will be introduced into the chamber 43 in any manner found most convenient, while power is applied to the shaft 46 to rotate the same and the rotor secured to the upper end thereof. As hereinbefore stated, the mechanism might be mounted upon any suitable supporting stand, either stationary or movable, and the material to be chopped can be introduced into the chamber 43 by hand or automatically, and one possible way of mounting the mechanism and effecting the introduction of the material into the chamber 43 is illustrated in FIG. 1 where the mechanism is shown mounted, together with the necessary power producing unit, upon the body or platform 14. In this showing of the mounting for the mechanism the pipe or neck 34 has coupled therewith one end of a gooseneck pipe which is generally designated 70 and which comprises a fixed upper end portion 71 which is secured to the pipe or neck 34 in a suitable manner as by a set screw 72, an intermediate flexible section 73 and a lower movable section 74 which extends downwardly and is connected with a suction nozzle 75. The suction nozzle is supported on the ground by suitable rollers or wheels 76, one only of which is shown, it being understood that there would be a second one in line with the one shown and the nozzle is held in desired position in front of the platform body 14 by an arm or arms 77 fixed at their forward ends to the nozzle and at their rear ends pivoted as at 78 to the platform. This would permit, together with the flexible intermediate portion 73 of the gooseneck, the up and down movement of the suction nozzle 75 while at the same time keeping the nozzle from straying from one side to the other as the apparatus is moved back and forth over the ground. The suction or air current producing means within the housing will then function to lift or suck leaves and other light material from the surface of the ground through the gooseneck conduit 70 and into the upper chamber 43 of the housing to be chopped into fine particles and discharged by way of the nozzle 43.

From the foregoing it will be seen that there is provided by the present invention a comminuting mechanism which is relatively simple in construction but which at the same time can be made sufficiently heavy and sturdy to withstand the strains imposed thereon in the operation of cutting up leaves, twigs, grass and the like which may be introduced into the housing. As will be readily apparent, the material as it falls through the opening 33 into the chamber will be driven down between the arms 53 of the rotor onto the foraminous wall plate 39 and as previously described, the moving fingers 59 will force the material between the fixed cutter fingers or blades 58 and chop and grind the material or shear the pieces as the sharp corners of the fixed and moving blades or fingers pass one another.

While the mechanism may be made in any desired size and the rotor may be turned at any desired speed, it has been found that a convenient size of the device for use by an average home owner would be one in which the housing would approximate 8 inches in height with an inlet opening of about 6 inches in diameter and a discharge opening of approximately the same area as the inlet. The foraminous wall in a housing structure of this height would be about 2 inches above the bottom wall 28 and the diameter of the housing would also be in the neighborhood of 8 inches.

The rotor arms in the mechanism of this size would be approximately one inch above the top of the foraminous wall plate. In this size mechanism the rotor is preferably driven at a speed of from 3450 to 4000 r.p.m.

As hereinbefore stated, while certain dimensions have been set forth, it is to be understood that these are not to be limiting in any way, as variations may be made therein as may be found desirable, but a mechanism constructed in accordance with these dimensions has been found to give highly satisfactory results.

The claims:

1. A comminuting mechanism comprising a housing having a top wall inlet and a side wall bottom outlet, a horizontal foraminous partitioning wall in the housing between the inlet and outlet whereby are formed upper and lower chambers, a rotor unit supported in the embodying arms in the upper chamber in spaced parallel relation with said partitioning wall, means connected with said rotor for transmitting rotary power thereto from a prime mover, stationary cutting elements carried by the foraminous wall in the space between the latter and the rotor unit, cutting elements carried by the rotor arms and disposed in said space for coaction with said stationary elements, and fan means in said upper chamber for drawing air thereinto and driving the air through the foraminous wall into the lower chamber.

2. The invention according to claim 1, wherein the stationary elements constitute rigid fingers in spaced relation with one another having longitudinal cutting edges and the rotor cutting elements comprise spaced rigid fingers adapted to pass between the stationary fingers in the turning of the fingers and the latter fingers having longitudinal cutting edges having coacting shearing action with the cutting edges of the stationary fingers upon material passing down between the arms.

3. The invention according to claim 2, wherein said fan means comprises a number of fan blades operatively coupled with the rotor unit to turn therewith.

4. A comminuting mechanism comprising a housing having a side wall and top and bottom walls, a material receiving opening in the top wall, a comminuted material discharge in the side wall adjacent to the bottom wall, an apertured plate disposed horizontally in the housing and secured around its periphery to said side wall in a plane above said material outlet whereby the housing is divided by the plate into upper and lower chambers, a shaft disposed vertically in the housing and having an end extended to the exterior thereof, the shaft being coaxial with the center of said plate, means supporting the shaft for rotation, means for transmitting rotary motion from a power source to said shaft, a rotor located within the material receiving chamber and secured to the shaft to be turned thereby, the rotor including arms radial to the shaft and moving in spaced parallel relation with said apertured plate, cooperating cutter blades carried by the apertured plate and by the rotor arms and located within the space between the plate and the rotor, and fan means disposed within the material receiving chamber and lying above the rotor for creating a forced draft through the housing from the material inlet to the lower chamber and to the material outlet.

5. The invention according to claim 4, wherein said cutter blades comprise straight rigid finger members arranged on the apertured plate and on the rotor arms in rows radial to the rotary axis of the rotor, the blades in the rows carried by the apertured plate being spaced apart and the blades carried by the rotor arms being spaced apart and disposed to pass between blades of the plate during the rotation of the rotor.

6. The invention according to claim 5, wherein said blades are of rectangular cross section and are disposed in their respective rows with opposite side faces lying in parallel planes.

7. A comminuting mechanism comprising a circular housing having top and bottom and side walls and having a material inlet in the top wall and a material outlet in the side wall adjacent to the bottom wall, an apertured plate within the housing and secured around its periphery to and against the circular side wall and disposed in a plane above said outlet, said apertured plate dividing the housing into a material receiving upper chamber and a comminuted material lower chamber leading to the outlet, a shaft extending vertically through the bottom wall and supported thereon for rotation and passing through the center of the apertured plate and terminating above the latter in the upper chamber, means carried by the lower end of the shaft below the bottom wall for transmitting rotary motion to the shaft from a power source, a rotor fixed to the top end of the shaft in the upper chamber and comprising a central body member and a plurality of radially disposed arms, a plurality of radial rows and radially spaced upstanding rigid cutter blades carried by said apertured plate, a row of rigid radially spaced cutter blades secured to each of said rotor arms and extending downwardly therefrom toward the apertured plate, the rotor arm-carried blades being positioned to pass between pairs of blades carried by the apertured plate in the turning of the rotor, and a fan blade secured to each of said rotor arms and extending upwardly therefrom and inclined from the horizontal in the direction of rotation of the rotor and functioning upon the turning of the rotor to draw air into the upper chamber through the inlet and force it downwardly with comminuted material through the openings of the apertured plate into the lower chamber and to said outlet.

8. The invention according to claim 7, wherein said rigid blades are of square cross section and are positioned in their respective rows to have two opposite flat faces in parallel substantially radial planes and the spacing between the blades of the rows carried by the apertured plate and by the rotor arms being such that the rotor-carried blades in passing between the apertured plate-carried blades will cooperate at their advancing longitudinal edges with longitudinal edges of plate-carried blades to shear or comminute material introduced into the space between the apertured plate and the rotor arms.

9. The invention according to claim 8, in combination with a wheeled carrier having said housing mounted thereon, a conduit connected at one end with the inlet opening in the top wall of the housing and terminating at its other end in a material pick-up nozzle, the conduit being substantially in the form of a gooseneck whereby said nozzles may be disposed at an elevation to pass over and in close proximity to the surface of the ground over which the wheeled carrier may pass, said fan blades additionally functioning to draw material into the nozzle and then into the upper chamber of the housing, and the said power source constituting a motor supported upon the wheeled carrier.

References Cited in the file of this patent

UNITED STATES PATENTS

| | | |
|---|---|---|
| 2,478,893 | Brant | Aug. 16, 1949 |
| 2,661,584 | Ronning | Dec. 8, 1953 |
| 2,669,078 | Gregory | Feb. 16, 1954 |